Jerry L. Dooley
Herbert R. McCarley,
INVENTORS.

Jerry L. Dooley
Herbert R. McCarley,
INVENTORS.

United States Patent Office 3,398,341
Patented Aug. 20, 1968

3,398,341
ACTIVE COMPENSATION NETWORK TO
STABILIZE AN INERTIAL PLATFORM
Jerry L. Dooley and Herbert R. McCarley, Huntsville,
Ala., assignors to the United States of America as represented by the Secretary of the Army
Filed Feb. 16, 1965, Ser. No. 433,232
8 Claims. (Cl. 318—18)

ABSTRACT OF THE DISCLOSURE

A compensation network for use in a stabilized platform system having gyroscopes in each of its three inertial reference loops to control a restoring torquer means in the system. A detection and amplification loop circuit is provided in each inertial reference loops and a compensation network is provided in each detection and amplification circuit. Each compensation network includes a second order lead circuit, a first order lead circuit and a proportional path.

---

The invention described herein may be manufactured and used by or for the Government for governmental purposes without the payment of any royalty thereon.

This invention generally relates to a system of stabilizing an inertial platform. More particularly this invention relates to the use of operational amplifiers to synthesize a compensation network used in the system to stabilize the inertial platform.

Design and successful operation of ballistic missiles presents a large number of engineering challenges. A major challenge is the continuing effort to develop inertial guidance systems with greater accuracy, reliability, and with miniaturization. In order to meet this challenge a known reference in space must be maintained with accuracy as this is a basic need in inertial navigation. To provide this reference, gyroscopes are mounted on a platform which is isolated from the vehicle body by a gimbal system. However, for a given platform the pitch, roll, and yaw system transfer functions will differ slightly because of different gimbal inertials and the gains associated with the system electronics. Therefore, a compensation network to overcome these differences becomes necessary.

In the past, practically all the compensation networks have used conventional resistors, capacitors, and inductors. These circuits have two major disadvantages: they are normally large and bulky in size; and they produce a large signal attenuation. Prior experience has indicated that stabilization networks have been required to yield 130 degrees of lead at the range of critical frequencies. In the past, to achieve this lead a large signal attenuation occurred in the networks.

The compensation system of the present invention is used to stabilize an inertial platform which utilizes air bearing gyroscopes. There are three approaches that can be taken to stabilize a platform. The three approaches for this type of platform are all passive networks, operational amplifiers, and buffer amplifiers with associated passive networks.

The operational amplifier approach has been chosen because with this method one can synthesize the compensation transfer function with a simplified network, and complete freedom can be used in selection of the pole-zero location of the network. Further, active compensation networks can be designed that have the characteristics of resistor, capacitor and inductor passive compensating networks; however, inductors are not required. The resistor-capacitor circuits can approach or even exceed the characteristics of compensation networks based on an ideal inductor, because they are not subject to the effects of parasitic resistance associated with real inductors.

The operational amplifier method permits the compensation network's physical size to be micro-miniaturized. By using thin film components, the size of the compensation network can be packaged small enough to be placed directly on the gimbal or case. This has been tried using all passive networks and the resultant components were large and bulky. The impedance method also gave a large attenuation, while the operational amplifier method gives a gain.

It is an object of this invention to provide an active compensation network in a system for stabilizing an inertial platform.

It is a further object of the present invention to provide a compensation network such that it may be micro-miniaturized.

A still further object of the invention is to provide a compensation network in which complete freedom can be used in selection of the pole-zero location of the network.

The invention further resides in certain novel features of construction, combinations and arrangements of parts. Further objects and advantages of the invention will be apparent to those skilled in the art to which it pertains, from the following description of the preferred embodiment thereof described with reference to the accompanying drawing, which forms a part of the specification, and wherein the same reference characters represent corresponding parts throughout the drawing, and in which.

Figure 1:
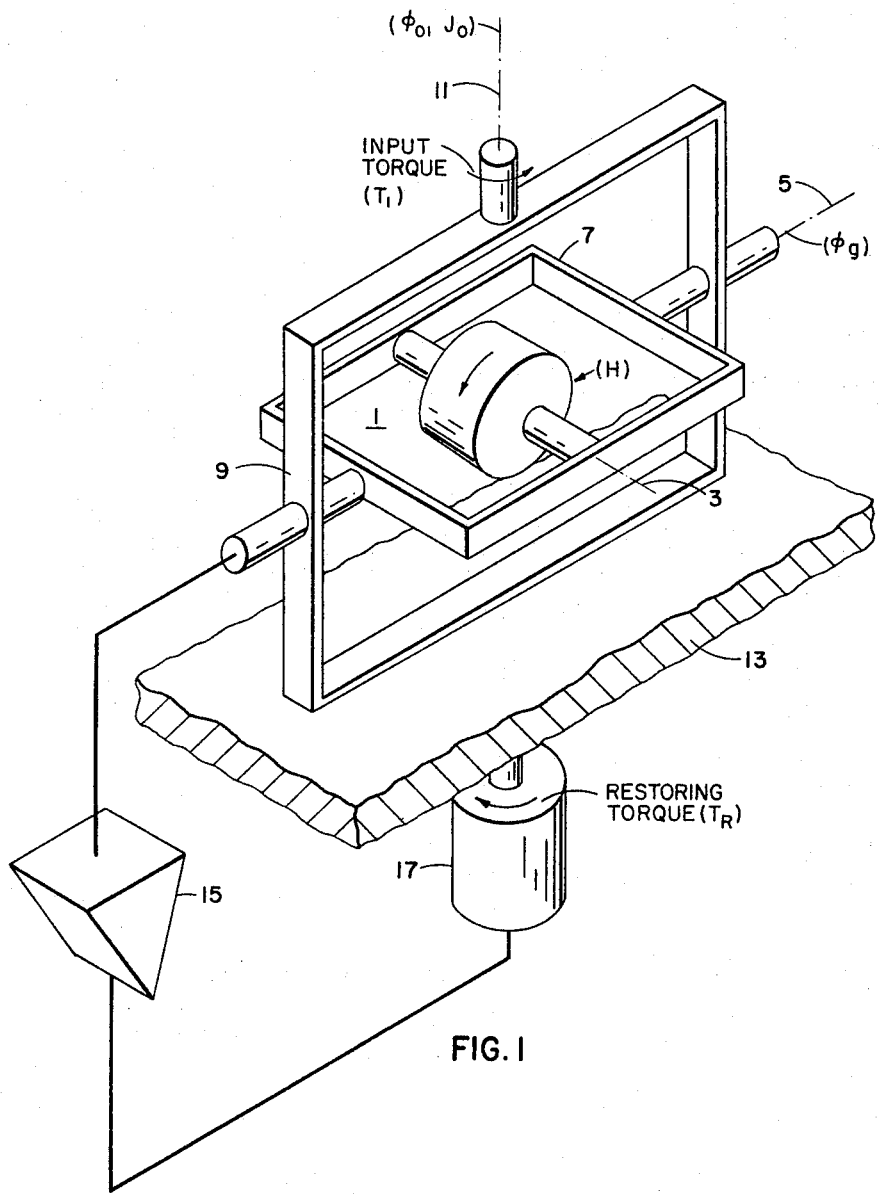
FIGURE 1 illustrates the relationship of the invention with respect to the stable platform and one of the single axis gyroscopes.

In order to better understand the operation of the system described in the figures, a description of their components referred to is first presented. A single axis air bearing gyroscope 1 is shown in FIGURE 1. Gyroscope 1 has a spin axis indicated by 3, an output axis indicated by 5, a gimbal 7, and a mounting frame 9. If a torque is applied to gyroscope 1 about its input axis 11 due to any disturbance of a stable platform gimbal 13 about input axis 11, the gyroscope will precess about output axis 5. Stable platform gimbal 13 is shown broken away as it is large compared to the gyroscope. The platform gimbal, of course, doesn't necessarily take a plane shape. The pick up, amplification and compensation networks are indicated by numeral 15. A torquer 17 is provided to oppose the input disturbance torque, thereby causing the gyro to return to its null position.

Figure 2:
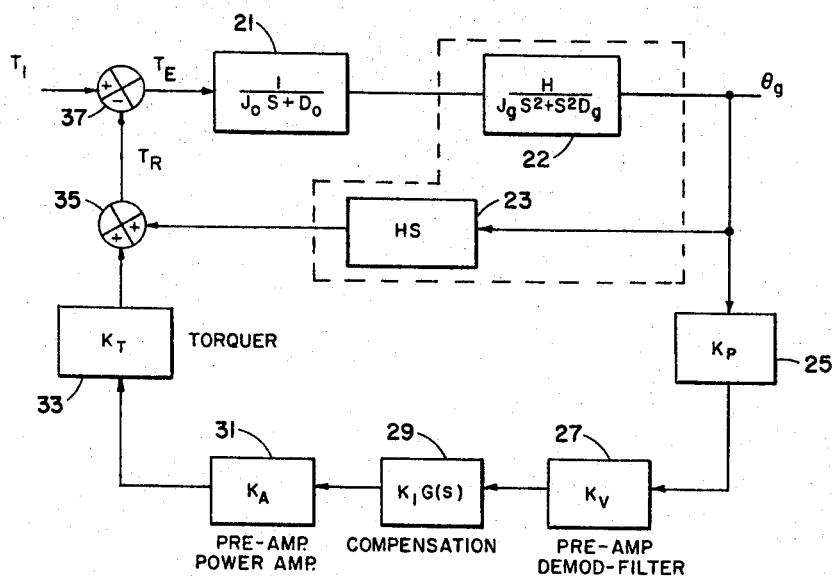
FIGURE 2 shows a single axis servo loop in block diagram according to the invention.
Figure 3:
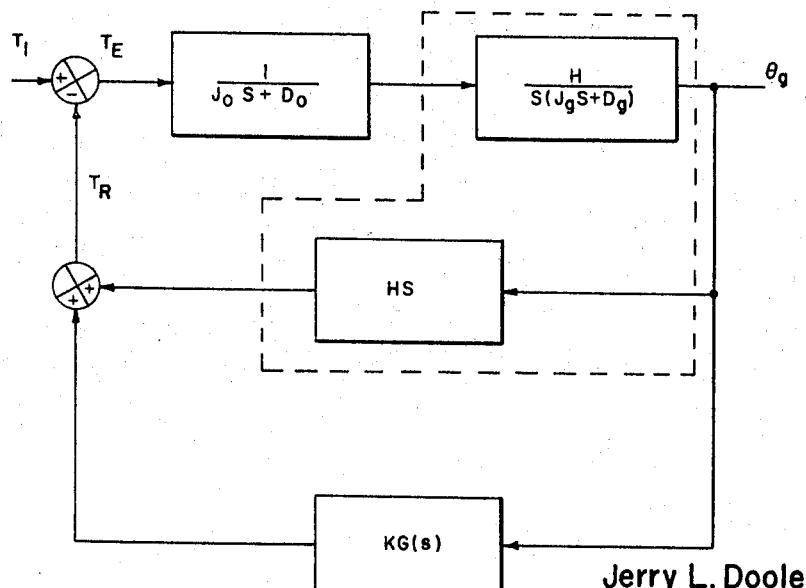
FIGURE 3 illustrates a simplified showing of the single axis servo loop in block diagram.
Figure 4:
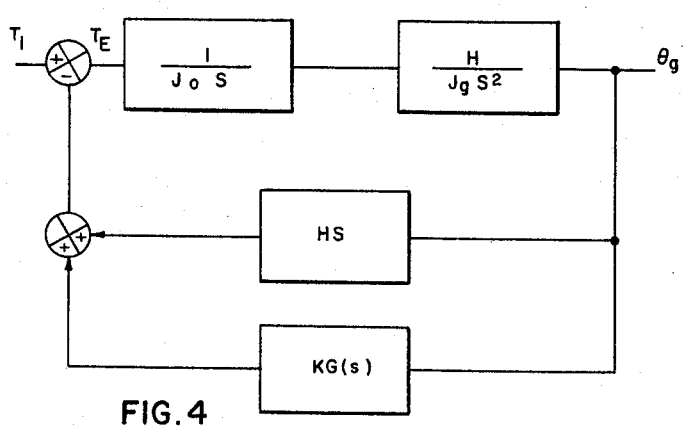
FIGURE 4 illustrates in block diagram a further simplification of the single axis servo loop.

FIGURE 2 shows the single axis servo loop of the air bearing gyroscope corrected platform gimbal. The gimbal factors are indicated block 21. Blocks 22 and 23 are the gyroscope factors. The other factors are indicated by blocks 25 for the pick-up; 27 for the pre-amplifier and the demodulator-filter; 29 for the compensation circuit; 31 for the pre-amplifier and power amplifier; and 33 for the torquer. Numerals 35 and 37 indicate summing points. FIGURES 3 and 4 show mathematical simplifications of FIGURE 2.

Figure 6:
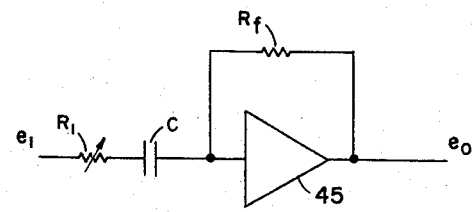
FIGURE 6 illustrates an approximate differentiator circuit.
Figure 5:
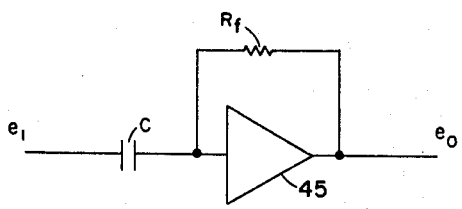
FIGURE 5 illustrates an operational amplifier differentiator.

FIGURE 5 shows an operational amplifier differentiator circuit in which $R_f$ is the feedback resistor, C is the input capacitor, and 45 is the amplifier. An approximate differentiator amplifier circuit is shown in FIGURE 6. An added input resistor $R_1$ is adjustable in this circuit.

Figure 7:
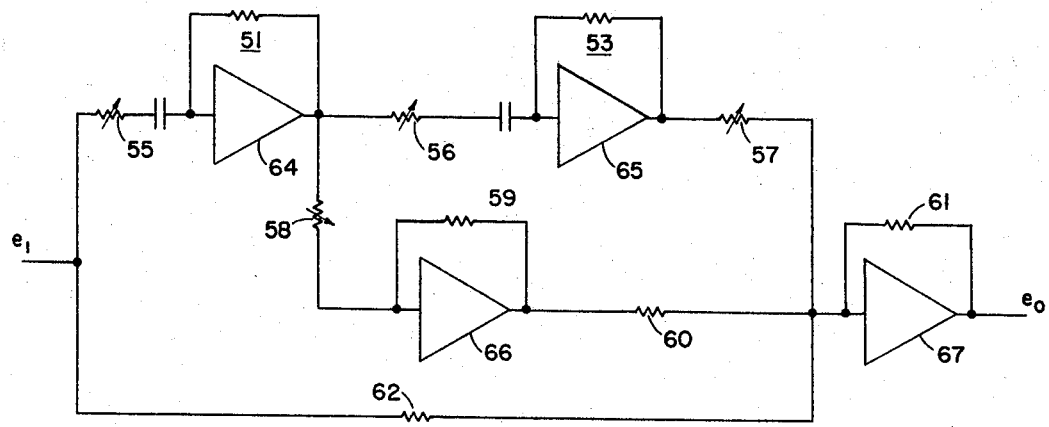
FIGURE 7 shows a schematic diagram illustrating a preferred form of the present invention.

FIGURE 7 illustrates the compensation circuit. Two approximate differentiator amplifier circuits 51 and 53 are provided. Elements 55 through 62 are resistors, elements 64 through 67 are amplifiers, and 69 and 70 are capacitors.

The stabilized platform in this invention utilizes air bearing gyroscopes in each of its three inertial reference loops. The operation of the three axes of the inertial gimbal stabilization are identical in principle and differ only in the numerical values of the parameters. This analysis will therefore be concerned with only one of these axes.

A single degree of freedom gyro gimbal system is shown in FIGURE 1. If an externally applied torque $T_1$ is applied about the gyro case input axis 11, the two following equations in Laplace terms can be written:

$$T_1 = (J_o S + D_o)\theta_o(s) + H\theta_g(s) + KG(s)\theta_g(s) \quad (1)$$
$$H\dot{\theta}_o = (J_g S + D_g)\theta_g(s) \quad (2)$$

and where:

$\theta_g$ = the angular rate of the output axis relative to inertial space (rad/sec.);
$J_o$ = the moment of inertia of the gimbal (gm.-cm.$^2$);
$J_g$ = the moment of inertia of the gyro (gm.-cm.$^2$);
$T_1$ = the externally applied torque about the gyro input axis;
$\theta_o$ = the angular rate of the input axis relative to inertia space (rad/sec.);
$H$ = the gyro wheel angular momentum (gm.-cm.$^2$/sec.);
$D_o$ = the viscous damping coefficient about the input axis (dyne-cm./rad/sec.);
$D_g$ = the viscous coupling coefficient of the gyro inner gimbal about the output axis (dyne-cm./rad/sec.);
$G(s)$ = amplification and compensation networks transfer function;
$K$ = amplification and compensation networks gain (dyne-cm./rad); and
$S,s$ = Laplace transformation variable.

Equations 1 and 2 may be written as:

$$\dot{\theta}_o = \frac{1}{J_o S + D_o}[T_1 - H\dot{\theta}_g + KG(s)\theta_g] \quad (3)$$

$$\dot{\theta}_g = \frac{1}{J_g S + D_g}[H\dot{\theta}_o] \quad (4)$$

Equations 3 and 4 can be represented in block diagram form as shown in FIGURE 3 where:

$T_R$ = restoring torque supplied by gimbal torquer and gyro reaction torque (dyne-cm.), and
$T_E = (T_1 - T_R)$ error torque.

Solving the diagram in FIGURE 3 for the closed loop transfer function one obtains $$\frac{\theta_g}{T_1} = \frac{H}{J_g J_o S^3 + (J_o D_g + J_g D_o)S^2 + (D_g D_o + H^2)S + HKG(s)} \quad (5)$$

The viscous coupling coefficient, $D_g$, is practically zero for an air bearing gyro, but is appreciable for the floated gyro. Spring restraints may be incorporated about the output axis; hence, the nature of $G(s)$ will depend on the type of gyro that is used. The gimbal damping coefficient $D_o$ is considered negligible in comparison to the acceleration coefficient, $J_o$. Since we are considering an air bearing gyro mounted on a gimbal with negligible damping about its axis of rotation.

$$D_g = D_o = 0 \quad (6)$$

Therefore Equation 5 becomes $$\frac{\theta_g}{T_1} = \frac{H}{J_g J_o S^3 + H^2 S + HKG(s)} \quad (7)$$

The analysis of the gyro stabilized platform loop is necessary to allow proper frequency shaping for the stabilization electronics to be designed and to predict the performance and accuracy of the platform for various torque disturbances. Since an air bearing gyro is being used, the loop being considered is unstable if it is not compensated.

Compensation is carried out in the platform electronics which also provide the required voltage gain and power to drive the gimbal torquers. The stability analysis is best carried out with the aid of the single axis loop block diagram which appears in FIGURE 4. This diagram represents each of the platform components individually and shows their relationship in the stabilization loop.

The closed loop transfer function is $$\frac{\theta_g}{T_1} = \frac{\frac{H}{J_o J_g}}{S^3 + \frac{H^2}{J_g J_o}S + \frac{H}{J_g J_o}KG(s)} \quad (8)$$

By letting $$\omega_n = \frac{H}{\sqrt{J_o J_g}} \quad (9)$$

then Equation 8 can be written as $$\frac{\theta_g}{T_1} = \frac{\frac{\omega_n^2}{H}}{S^3 + \omega_n^2 S + \frac{\omega_n^2}{H}KG(s)} \quad (10)$$

where $n$ is known as the nutation frequency. From Equation 10 the characteristic equation of this loop is $$S^3 + \omega_n^2 S + \frac{\omega_n K}{H}G(s) = 0 \quad (11)$$

It is noted that if stabilization is to be achieved the compensation transfer function must be of the form $$AS^2 + BS + C = G(s) \quad (12)$$

since the second order term is missing the characteristic equation of the system. Therefore, the compensation must contain at least a second order lead network, a first order lead network, and a proportional path.

Normally, it is not desirable to generate pure lead terms, since they are susceptible to noise saturation. For this reason, a ratio of two quadratics is substituted for the pure leading quadratic. The characteristics of the ratio of quadratics are such that the zeros are identical to the desired pure lead and the poles are placed at some high frequency above the servo frequency.

If the necessary lead required (that of Equation 12) in Equation 11 is to be obtained using operational amplifiers, then a differentiator must be used. The circuit for a true differentiator is shown in FIGURE 5. The transfer function of the differentiator is $$\frac{e_o}{e_1} = -R_f C S \quad (13)$$

Normally, a differentiator should not be used since it decreased the signal to noise ratio and may frequently be driven to saturation and overload. Because of its noise-amplifying property, a true differentiator is usually not practical. However, some of the disadvantages of the true differentiator can be overcome by using an approximate differentiating circuit shown in FIGURE 6.

The transfer function for this circuit is $$\frac{e_o}{e_1} = -\frac{R_f}{R_1}\frac{S}{S + \frac{1}{R_1 C}} \quad (14)$$

The input resistor $R_1$ can be adjusted to make a reasonable compromise between output noise and close approximation to a true differentiator. Generally, it is sufficient to place this pole about 10 times as far away from the nearest pole of the system being studied.

However, once the resistor is set, $R_f$, $R_1$, and $C$ are all constants, and Equation 14 and the transfer function of the approximate differentiator circuit is $$e_o = \frac{mS}{S + n} \quad (15)$$

where $m$ and $n$ are constants.

Since a true differentiator cannot be used and the compensation must contain a second order lead, a first order lead and a proportional path (from the missing terms missing in the characteristic Equation 11 above), the compensation transfer function may also be of the form $$KG(s) = K\left[\frac{AS^2 + BS + C}{(S+D)^2}\right] \quad (16)$$

where A, B, C, and D are constants.

Equation 16 can be realized by using the differentiator shown in FIGURE 6 if the equation is put into the form $$G(s) = \frac{aS^2}{(S+D)^2} + \frac{bS}{S+D} + d \quad (17)$$

where $a$, $b$, and $d$ are constants.

Getting a least common denominator in Equation 15 gives $$G(s) = \frac{(a+B+D)S^2 + D(2d+b)S + dD^2}{(S+D)^2} \quad (18)$$

To solve for the unknown constants the coefficients of Equation 17 and Equation 18 are equated to give:

$$a + b + d = A \quad (19)$$

$$2d + b = \frac{B}{D} \quad (20)$$

$$d = \frac{C}{D^2} \quad (21)$$

The compensation network is now synthesized as shown in FIGURE 7 to realize Equation 17. The first factor of Equation 17 is gotten by connecting two approximate differentiator amplifier circuits 51 and 53 in series. This gives an input to output of the form $$-\frac{m_1 S}{S+n_1} \cdot \frac{m_3 S}{S+n_3}$$

By choice of the proper values for the differentiators and the output amplifier 68 this can be made to be identical with the first factor of Equation 17, which is the second order lead term. By the use of the loop with amplifier 70 in it, the second factor $$\frac{bS}{S+O}$$

of Equation 17 can easily be added to compensation network. This factor is the first order lead term. The proportional path, which is the last factor of Equation 17, is derived through the resistor 62 loop of the compensation network of FIGURE 7.

It can be noted from Equation 14 that the size of the input resistor and capacitor will determine the location of the poles added by the compensation network. The path through both differentiators can also be made symmetrical since the gain through this loop can be varied by varying resistor 57. The single lead requires an additional operational amplifier 70 to obtain the proper sign at summing amplifier 68 input. Also, the gain in this loop can be varied by varying resistor 60. The proportional path is fed through resistor 62. The proportional loop can actually have a gain instead of the attenuation which will occur when passive components are used.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated. It will be apparent to those skilled in the art that changes may be made in the form of the apparatus disclosed without departing from the spirit of the invention as set forth in the disclosure, and that in some cases certain features of the invention may sometimes be used by advantage without a corresponding use of other features. It is therefore to be understood that within the scope of the appended claims the invention may be practiced otherwise than as specifically described. Accordingly, it is desired that the scope of the invention be limited only by the appended claims.

We claim:

1. In a stabilized platform system having gyroscopes in each of its three inertial reference loops to control a restoring torquer means in the system, each inertial reference loop including a detection and amplification loop circuit, a compensating network connected in each of said detection and amplification loop circuit supplying said restoring torquer means, each of said compensating networks comprising: two series connected approximate amplifier differentiator means forming a second order lead circuit; a first amplifier connected in series with one of said approximate amplifier differentiator means to form a first order lead circuit; a resistor connected in parallel with said second order lead circuit forming a proportional path.

2. In a stabilized platform system as set forth in claim 1, wherein said compensating networks are active compensating networks containing operational amplifiers.

3. In a stabilized platform system as set forth in claim 2, wherein each of said approximate amplifier differentiator means has an adjustable input resistor.

4. A compensating network which has requirements of producing a second order lead component, a first order lead component, and a proportional path; said network comprising an input terminal, an output terminal, first and second approximate amplifier differentiator means, a first amplifier, and a first resistor; said input terminal being connected to an input of said first approximate amplifier differentiator means; an output of said first differentiator means being connected to an input of said second differentiator means; an output of the second differentiator means being connected to a junction; said junction being connected to said output terminal; the first amplifier being connected between the output of said first differentiator means and said junction; and said first resistor being connected between the input terminal and said junction.

5. A compensating network as set forth in claim 4, further comprising a second resistor connected between the output of said second differentiator means and the junction, and a third resistor connected between the output of the first amplifier and said junction.

6. A compensating network as set forth in claim 5, wherein said resistors are adjustable.

7. A compensating network as set forth in claim 6, further comprising a summing amplifier connected between said junction and the output terminal.

8. A compensating network as set forth in claim 7, wherein said approximate amplifier differentiator means and said amplifiers are all adjustable.

References Cited

UNITED STATES PATENTS

Re. 26,228  6/1967  Larson _____ 318—489 XR
3,139,572  6/1964  Evans _____ 318—28 XR

FOREIGN PATENTS 1,292,318  3/1961  France.

BENJAMIN DOBECK, *Primary Examiner.*